United States Patent [19]

Coe, Jr.

[11] 4,093,156
[45] June 6, 1978

[54] SUPERSONIC TRANSPORT

[75] Inventor: Paul L. Coe, Jr., Yorktown, Va.

[73] Assignee: The United States of America as represented by the Administrator of the National Aeronautics and Space Administration, Washington, D.C.

[21] Appl. No.: 718,244

[22] Filed: Aug. 27, 1976

[51] Int. Cl.² .................... B64C 3/08; B64C 5/04
[52] U.S. Cl. .................... 244/45 A; 244/46; 244/218
[58] Field of Search .............. 244/43, 46, 45 A, 48, 244/56, 201, 218

[56] References Cited

U.S. PATENT DOCUMENTS

| | | | |
|---|---|---|---|
| 3,069,115 | 12/1962 | Strang | 244/43 |
| 3,447,761 | 6/1969 | Whitener et al. | 244/46 |
| 3,642,234 | 2/1972 | Kamber et al. | 244/45 A |
| 3,730,458 | 5/1973 | Haberkorn | 244/47 |
| 3,738,595 | 6/1973 | Bouchnik | 244/43 |
| 3,884,435 | 5/1975 | Cory et al. | 244/46 |
| 3,926,389 | 12/1975 | Mederer | 244/45 A |

*Primary Examiner*—Trygve M. Blix
*Assistant Examiner*—Charles E. Frankfort
*Attorney, Agent, or Firm*—Howard J. Osborn; John R. Manning; Wallace J. Nelson

[57] ABSTRACT

An aircraft of supersonic transport configuraton featuring thrust vectoring in conjunction with wing apex segments used as canard surfaces during take-off, landing, and low-speed flight. The angle of incidence of the wing apex segments, when the segments are functioning as canard surfaces, is variable with respect to the aircraft angle of attack. The wing apex segments furthermore form a portion of the main wing panel swept leading edge when not functioning as canard surfaces. The combination of thrust vectoring and deployable wing apex segments results in increased aircraft range and improved low-speed longitudinal stability while providing acceptable take-off length capabilities.

5 Claims, 6 Drawing Figures

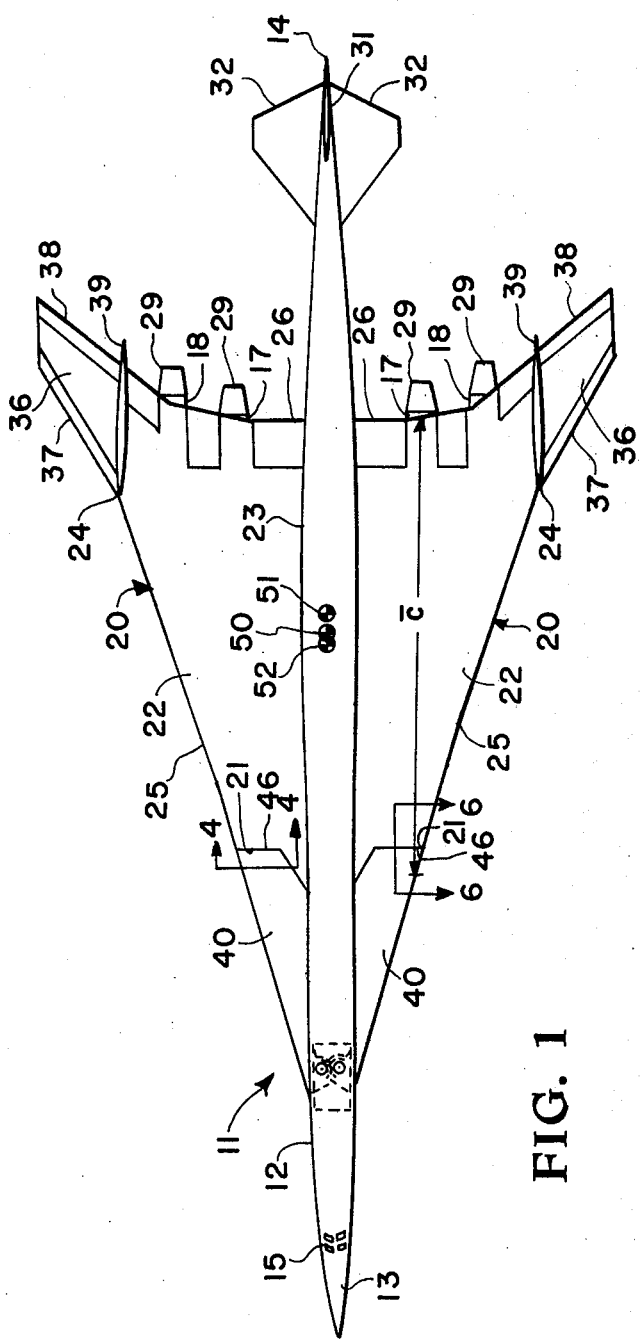
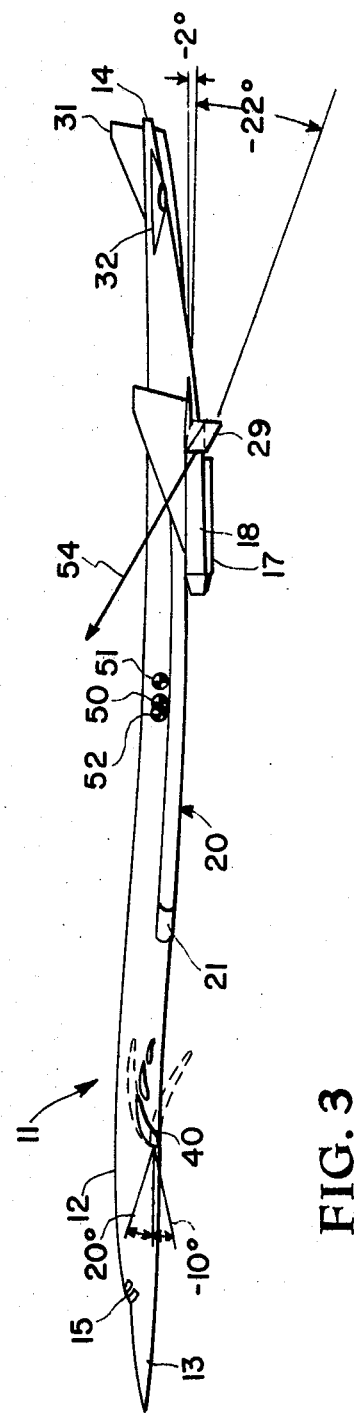
FIG. 1
FIG. 3

SUPERSONIC TRANSPORT

ORIGIN OF THE INVENTION

The invention described herein was made by an employee of the United States Government and may be manufactured and used by or for the Governmental for governmental purposes without the payment of any royalties thereon or therefor.

BACKGROUND OF THE INVENTION

Wind tunnel investigations of supersonic transport configurations having highly swept arrow wings indicate that high levels of aerodynamic efficiency can be obtained at Mach numbers on the order of 2.7. Furthermore, the investigations indicate that minimum trim drag at supersonic speeds can be obtained by positioning the aircraft center-of-gravity relatively far aft.

However, such configurations exhibit relatively poor low-speed characteristics. In particular, the highly-swept arrow wing configuration exhibits a comparatively shallow lift-curve slope which, when coupled with the aircraft tail scrape angle, limits take-off lift coefficients to values of approximately 0.55. Furthermore, for this take-off lift coefficient of 0.55 to be achieved, a fairly high angle of attack is necessary which constrains airframe design to inclusion of both a "visor"-type nose, to provide acceptable pilot visibility, and an elongated landing gear installation to maximize tail scrape angle. Moreover, this high angle of attack results in a significant increase in drag imposing penalties on low-speed performance.

The most significant penalty involves the take-off field length constraint. In order to provide acceptable take-off field lengths, the conventional highly-swept arrow wing configuration requires a wing area and installed thrust substantially above that required to provide efficient supersonic cruise. As a consequence, aircraft range is forfeited.

The second problem, encountered in the low-speed flight regime, is the nonlinear variation of pitching moment with respect to angle of attack. There is a tendency for the aircraft to pitch up due to the formation of vortices at the wing apex as the aircraft angle of attack is increased.

The third significant problem associated with such configurations is the forward shift in aerodynamic center as the aircraft speed goes from supersonic to subsonic. Where the aircraft center-of-gravity is positioned to provide minimum trim drag at design Mach numbers of approximately 2.7, the shift in aerodynamic center to a more forward position at low speeds induces longitudinal instability.

It is therefore an object of the present invention to increase take-off lift at a reduced angle of attack.

Another object of the present invention is to apply thrust vectoring concepts to increase take-off lift.

A further object of the invention is to offset the pitching moment induced by thrust vectoring.

An additional object is to eliminate the nonlinear variation in pitching moment as related to angle of attack.

A further additional object is to restrain the formation of wing apex vortices which cause nonlinear variations in pitching moment with respect to aircraft angle of attack.

Another additional object is to provide longitudinal stability at low speeds.

A still further object is to provide canard surfaces for low speed longitudinal stability while maintaining an aircraft configuration providing efficient supersonic cruise.

SUMMARY OF THE INVENTION

These and other objects of the present invention are achieved by providing a supersonic transport, having the highly swept arrow wing configuration, with deflectable jet exit nozzles to provide thrust vectoring and movable wing apex segments which act as canard surfaces.

Studies have shown that the application of thrust vectoring concepts, the deflection of jet exit nozzles and consequently thrust downward, provides significant improvements in take-off lift characteristics. Specifically, the take-off lift coefficient can be increased from approximately 0.55 to approximately 0.7, and this can be accomplished at a reduced angle of attack. The increased take-off lift coefficient reduces wing area and installed thrust requirements, permitting an improved match between the engine and the airframe which results in an increase in range while maintaining acceptable aircraft take-off field length capabilities. Moreover, the reduced angle of attack permits elimination of the "visor" nose requirement and allows reductions in the length of the landing gear, such modifications representing significant volume and weight savings.

The elements constituting the other major component of the present invention are movable wing apex segments, structures highly compatible with both the supersonic transport configurations and the application of powered lift. The wing apex segments are hinged so as to be separable from the main wing by forward rotation in the wing plane thus forming aerodynamically independent canard surfaces. Their deployment effectively removes the wing apex to create a more linear variation in pitching moment with respect to angle of attack over a larger range of angles by preventing the formation of wing apex vortices as previously mentioned. Rotation of the wing apex segments rearward to constitute an integral part of the highly swept wing surfaces creates an aircraft configuration having the desired minimum trim drag for efficient supersonic cruise.

In addition to their deployment capability, the wing apex segments are furthermore angularly positionable such that their angle of incidence is variable relative to aircraft angle of attack. Thus, the deployed wing apex segments minimize one drawback associated with the application of thrust vectoring to supersonic transport configurations. Specifically, thrust vectoring shifts the vector component of thrust aft of aircraft center of gravity during take-off creating a large negative, or nose down pitching moment. By selectively positioning the angle of incidence of the deployed wing apex segments to provide a large lift component forward of aircraft center of gravity during take-off, the undesirable nose down pitching moment created by thrust vectoring is cancelled out.

Moreover, the deployment and selective positioning of the wing apex segments in conjunction with thrust vectoring minimizes another problem associated with supersonic transport configurations. A reduction in flight speed from supersonic to subsonic is accompanied by a forward shift in aircraft aerodynamic center, inducing longitudinal instability. Selectively positioning the wing apex segments so that their angle of incidence produces a variable lift component and the jet exit nozzles so that their angle of declination increases the positive lift component of the thrust vector tends to restore longitudinal stability to the aircraft in its initial trim condition.

A more complete appreciation of the invention and many of the attendant advantages thereof will be readily apparent as the same becomes better understood by reference to the following detailed description when considered in connection with the accompanying drawings wherein:

BRIEF DESCRIPTION OF THE DRAWINGS

FIG. 1 is a plan view of the powered-lift supersonic cruise aircraft of the present invention with the wing apex segments retracted so as to be an integral part of the aircraft wing planform;

FIG. 3 is a side view of the aircraft showing the wing apex segments deployed as canard surfaces with the angle of incidence varied from aircraft angle of attack;

DETAILED DESCRIPTION

Figure 2:
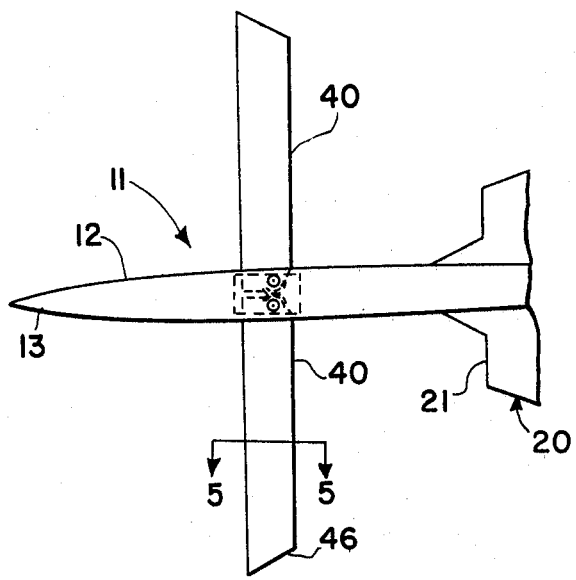
FIG. 2 is a plan view of the aircraft of the present invention with the wing apex segments deployed as canard surfaces separate from the main wing.

Referring now to the drawings wherein like reference numerals designate identical parts throughout the several views, there is shown a fixed swept-wing planform aircraft, generally designated by reference numeral 11. Aircraft 11 is provided with a fuselage 12 having a length-to-equivalent-diameter, or fineness ratio suitable for supersonic flight, and including a right-circular conical nose 13 at the forward end thereof and terminating in a conical tip 14 at the aft end thereof. A suitable control compartment or pilot's cabin 15 is also included in the nose 13 of fuselage 12. A conventional empennage assembly including a vertical stabilizer 31 and swept horizontal stabilizers 32 is provided projecting outwardly from the aft end of fuselage 12. The airfoil sections of these stabilizer members 31 and 32 are preferably taken from the supersonic family of symmetrical thin airfoils.

Aircraft 11 is provided with a wing, generally designated by numeral 20, projecting substantially horizontally outward from each side of the fuselage 12 aft of nose 13 and terminating forward of conical tip 14. As will be further explained hereinafter, a pair of engine nacelles 17 and 18 are fixedly attached to each wing 20.

In the preferred embodiment, aircraft 11, as shown in FIG. 3 is of the arrow, low-wing type with the upper surface of wings 20 being substantially flush with the midline of fuselage 12, although mid- and high-wing arrangements are also considered to fall within the scope of the present invention.

Each wing 20 includes a main wing panel 22 fixedly interconnected with fuselage 12, and a forwardly disposed wing apex segment 40, later described in detail, extending along an initial portion of the swept leading edge 25 of main wing panel 22. Each wing panel 22 includes a root section 23 adjacent the side of fuselage 12 and a tip 24 disposed outboard of the root section 23. The forward extremity of root section 23 is positioned somewhat aft of nose 13 and forward of the longitudinal midpoint station of fuselage 12. The spanwise length of each main wing panel 22 between the root section 23 and the tip 24 is on the order of about four times the maximum width of fuselage 12.

Each main wing panel 22 has a forward notched edge 21 and a leading edge 25 swept back at an angle of the order of about 74° connecting the forward extremities of root section 23 and tip 24 thereof, and a trailing edge 26 connecting the aft extremities of the root and tip sections.

An outboard wing panel 36 is integrally secured to each main wing panel a tip 24 thereof. The leading edge 37 of each outboard panel 36 extends outwardly and rearwardly from the point at which panel 36 connects with main wing panel 22 to thereby provide a notched leading edge continuation thereof. Each outboard wing panel 36 is also provided with a straight trailing edge 38 which extends outwardly and rearwardly from trailing edge of panel 22. A pair of vertical fin or tail stabilizers 39 are integrally connected to main wing panel 22 and outboard wing panel 36 at the notched inner connection thereof.

As mentioned hereinbefore, an inboard engine nacelle 17 and an outboard engine nacelle 18 are located beneath each wing 20. A thrust vectoring nozzle 29 is hingedly connected to each nacelle 17 and 18 in a conventional manner and conventional actuator means (not shown) are provided for positioning the nozzles 29 in unison at an angle between −2° and −22° with respect to the wings to thereby direct engine thrust resulting in an increased lift coefficient across a range of aircraft angles of attack.

Figure 4:
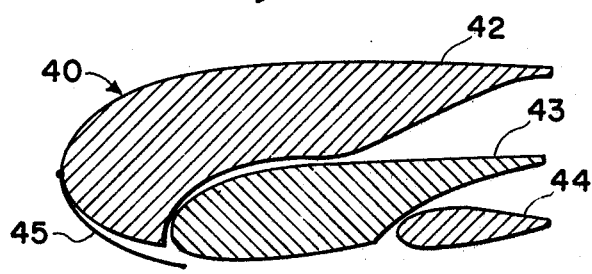
FIG. 4 is a section taken at 4—4 of FIG. 1 of the elements of the wing apex segments in the undeployed position.
Figure 6:
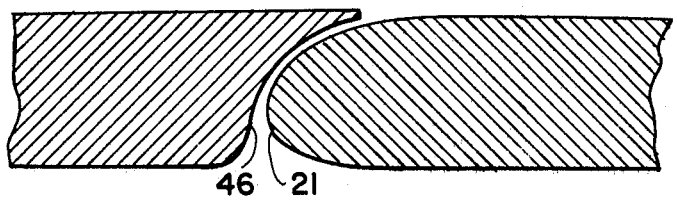
FIG. 6 is a section taken at 6—6 of FIG. 1 showing the configuration of the tip of the wing apex segment and the main wing panel at their juncture.

As mentioned hereinbefore, wing 20 is provided with wing apex segments 40 forwardly disposed and extending along an initial length of swept leading edges 25. In the undeployed position shown in FIG. 1, wing apex segments 40 form an integral portion of the wing aerodynamic surface creating a highly swept arrow planform. As shown in FIG. 4, a section taken along 4—4 of FIG. 1, each wing apex segment 40 consists of leading member 42, midmember 43 and trailing member 44 stacked in the undeployed or stowed position to form a cross-section complimenting that of the leading edge 25 of main wing section 22. Flap 45, hingedly attached to leading member 42, is deployed in this stowed position to more completely achieve the desired cross-section. As shown in FIG. 6, a section taken along 6—6 of FIG. 1, notched edge 21 of main wing panel 22 forms a curved aerodynamic leading edge for smooth air flow when wing apex segments 40 are deployed as canard surfaces. Additionally, tips 46 of each leading member 42 of wing apex segments 40 have a curved tapered portion, as shown in FIG. 6, which permits a smooth transition in the stowed position between wing apex segments and wing panels.

Wing apex segments 40 are pivotally connected to fuselage 12 in a conventional manner and actuator means (not shown) are provided for forwardly deploying wing apex segments 40 as independent canard surfaces separate from main wing panels 22 as shown in FIG. 2. In the deployed position shown in FIG. 5, a section taken along 5—5 of FIG. 2, each wing segment 40 forms a high lift canard surface by the repositioning of leading member 42, midmember 43, and trailing member 44 relative to one another while flap 45 is retracted to a position proximate with the underside of the leading edge of leading member 42 to more completely achieve the desired cross-section.

Wing apex segments 40 are furthermore rotatably connected to fuselage 12 by conventional means for movement within a range of 10° declination to 20° inclination with respect to the centerline of fuselage 12. Actuator means (not shown) are provided for altering the position of the wing apex segments 40 in unison such that their angle of incidence can be varied relative to the angle of attack of main wing panels 22. By so doing, a lift component of varying magnitudes can be generated forward of aircraft center of gravity 50.

The actual construction of the wing apex segments pivotal connection as well as the control mechanisms and actuators to effect both forward deployment of members 42, 43 and 44 and the rotation of wing apex segments 40 as canard surfaces have been omitted in the interest of clarity, inasmuch as these details are considered conventional components and well known in the art.

OPERATION

In operation the present invention fully exploits the advantages inherent in highly swept arrow wing configuration at supersonic speeds and provides components which minimize the disadvantages of this configuration during take-off and low-speed flight regimes.

During take-off, thrust vectoring nozzles 29 connected to each engine nacelle 17 and 18 are deflected downward in unison as shown in FIG. 3. This results in take-off lift coefficient of 0.7 as compared to 0.55 for a similar configuration not utilizing thrust vectoring. The increased value of the take-off lift coefficient reduces the wing area and installed thrust requirements permitting an improved match between engine and airframe which, in turn, results in approximately a 12.5% increase in range while still providing acceptable take-off field length capabilities. Furthermore, this high take-off lift coefficient can be achieved at a reduced angle of attack. The reduced angle of attack eliminates the necessity of a "visor" nose and also reduces the length of the landing gear with respect to that utilized in contemporary supersonic transport configurations.

Figure 5:
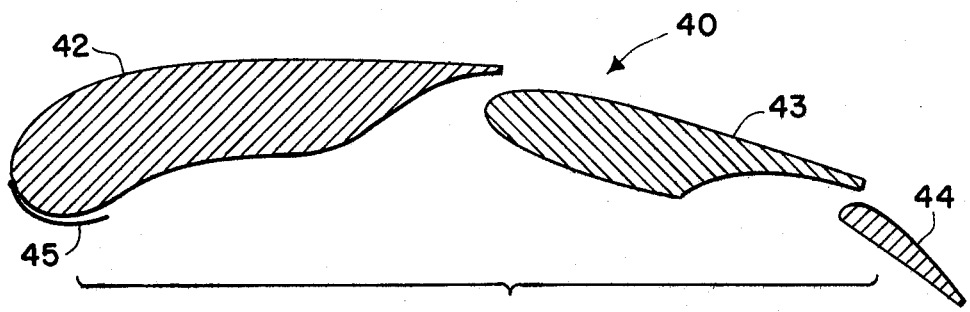
FIG. 5 is a section taken at 5—5 of FIG. 2 of the elements of the wing apex segment in the deployed position.

During take-off, wing apex segments 40 are deployed as in FIG. 2, the relative positions of leading member 42, midmember 43, trailing member 44 and flap 45 being as shown in FIG. 5. Furthermore, thrust vectoring nozzles 29 are positioned at substantially 22° declination with respect to wings 20. The thrust vectoring results in a large negative, or nose down pitching moment since the vector component of thrust 54 passes aft of the center of gravity 50. By deploying wing apex segments 40 as canard surfaces and angularly positioning them to produce a forward positive lift component of desired magnitude, a positive, or nose-up pitching member is generated which cancels the negative pitching moment introduced by thrust vectoring.

During the subsonic and transonic phases of flight, wing apex segments 40 remain deployed in the forward position shown in FIG. 2 thereby forming independent aerodynamic canard surfaces for the aircraft. Contemporary supersonic transport configurations have a characteristic non-linear variation in pitching moment with respect to aircraft angle of attack due to the formation of wing apex vortices as the aircraft angle of attack is increased. Deployment of wing apex segments 40 as canard surfaces effectively removes the apex of wing 20 which significantly delays the onset of wing vortex formation resulting in a substantially linear variation in pitching moment as aircraft angle of attack is increased.

During supersonic phases of flight, wing apex segments 40 are retracted to the positions shown in FIG. 1. This operation involves the reorientation of leading member 42, midmember 43 and trailing member 44 into a "stacked" relationship and the deployment of flap 45 to produce the cross section shown in FIG. 4 complimenting that of the leading edge 25 of main wing section 22. The blending of the wing apex segments 40 with main wing panel 22 is enhanced by the shape of apex segment tip 46, as shown in FIG. 6. Furthermore, thrust vectoring nozzles 29 are positioned at substantially 2° declination with respect to wings 20. These operations result respectively in the formation of an aerodynamic wing surface complimentary to efficient supersonic cruise flight and the provision of maximum aircraft forward thrust.

As the speed of the aircraft drops from supersonic to subsonic, a shift in aerodynamic center occurs. In the preferred embodiment, aircraft center of gravity 50, shown in FIG. 1, is located at approximately 53.8 percent of the wing mean chord length ($c$) 53. As illustrated in FIG. 3, aircraft aerodynamic center shifts forward from cruise location 51, at approximately 57.1 percent $c$, to low speed location 52, at approximately 51 percent $c$. The longitudinal instability associated with this forward shift is counteracted by employing thrust vectoring in combination with wing apex segment deployment and positioning to restore the aircraft to its initial trim condition. In so doing, nozzles 29 are rotated downward from a cruise declination of approximately 2° with respect to the wings to produce a greater positive lift component behind aerodynamic center 52. Simultaneously, members 42, 43, 44 and 45 forming each wing apex segment 40 are forwardly deployed from the stacked cruise positions shown in FIGS. 1 and 4 to the relative positions shown in FIGS. 2 and 5 to form canard surfaces. Following deployment at a "no-lift" angle of incidence, wing apex segments 40 are angularly positioned to produce a variable lift component forward of center of gravity 50.

From the foregoing description, it is readily apparent that the applicant has developed an aircraft utilizing a combination of components which fully exploit the favorable characteristics of a highly swept arrow planform as it applies to supersonic flight regimes and which minimize the unfavorable characteristics evidenced in such configurations during take-off, subsonic and transonic flight regimes. Obviously, many modifications and variations of the present invention are possible in the light of the above teachings. It is to be understood, therefore, that the foregoing disclosure relates only to a specific embodiment of the invention, and that numerous modifications, variations and uses of the present invention are possible in the light of the above teachings, as will be readily apparent to those skilled in the art without departing from the spirit and scope of the present invention as set forth in the appended claims.

What is claimed as new and desired to be secured by Letters Patent of the United States is:

1. An aircraft having supersonic flight capabilities comprising:
   a fuselage having a fineness ratio suitable for supersonic flight;

a wing connected to each side of said fuselage and projecting outwardly therefrom, each said wing including:

(a) a main wing panel having a relatively thick swept leading edge and a relatively thin trailing edge, said main wing panel having notched leading edge means for receiving a movable wing apex segment in its stowed position;

the wing apex segment forming a forward extension of the swept leading edge of said main wing panel in the stowed position for efficient supersonic cruise, said wing apex segment being separable from said wing and both pivotal and rotatable to a deployed position such that said wing apex segment acts as an independent aerodynamic surface providing a lift component to said aircraft forward of said main wing panel, said wing apex segment being further segmented into members to obtain desired sectional configurations; the wing apex segment providing a substantially linear variation in aircraft pitching moment with respect to aircraft angle of attack by suppressing the formation of wing apex vertices when the wing apex is in a deployed position;

at least one engine nacelle affixed beneath each said wing and terminating substantially at the trailing edge thereof; an engine contained in each said nacelle for producing thrust; and jet exit nozzles hingedly attached to substantially the rearmost extremity of each said nacelle so constructed and arranged as to direct thrust;

means for selectively positioning said jet exit nozzles such that their angle of declination increases the positive lift component of the thrust vector during reductions in flight speed from supersonic to subsonic; and means for selectively positioning said wing apex segments and segmented members so that their angle of incidence produces a variable forward lift component providing artificial longitudinal stability to said aircraft in its initial trim condition.

2. The aircraft of claim 1 wherein said notched leading edge means of each said main wing panel has a curved aerodynamic leading edge for smooth airflow about said main wing panel when said wing apex segment is in the deployed position.

3. The aircraft of claim 1 wherein each said wing apex segment includes a curved tapered tip for smooth transition between said notched leading edge means of said main wing panel and said wing apex segment in the stowed position to create an aerodynamic surface conducive to efficient supersonic flight.

4. The aircraft of claim 1 wherein each said wing apex segment is comprised of a plurality of said members each having a cross-section complimentary to that of the other said members and the relative position of each said member being alterable with respect to the other said members in such a manner that in the deployed position said plurality of members are positioned substantially in line, the composite cross-section thereby provided forming an aerofoil; and in such a manner that in the stowed position said plurality of members forms a substantially stacked configuration the composite cross-section thereby provided complimenting said relatively thick swept leading edge of said main wing panel and thus blending in as an integral portion of said wing.

5. The aircraft of claim 1 and including means for angularly positioning said wing apex segments in the deployed position such that the angle of incidence of said wing apex segments is selectively variable between $-10°$ and $+20°$.

* * * * *